Figure 2:
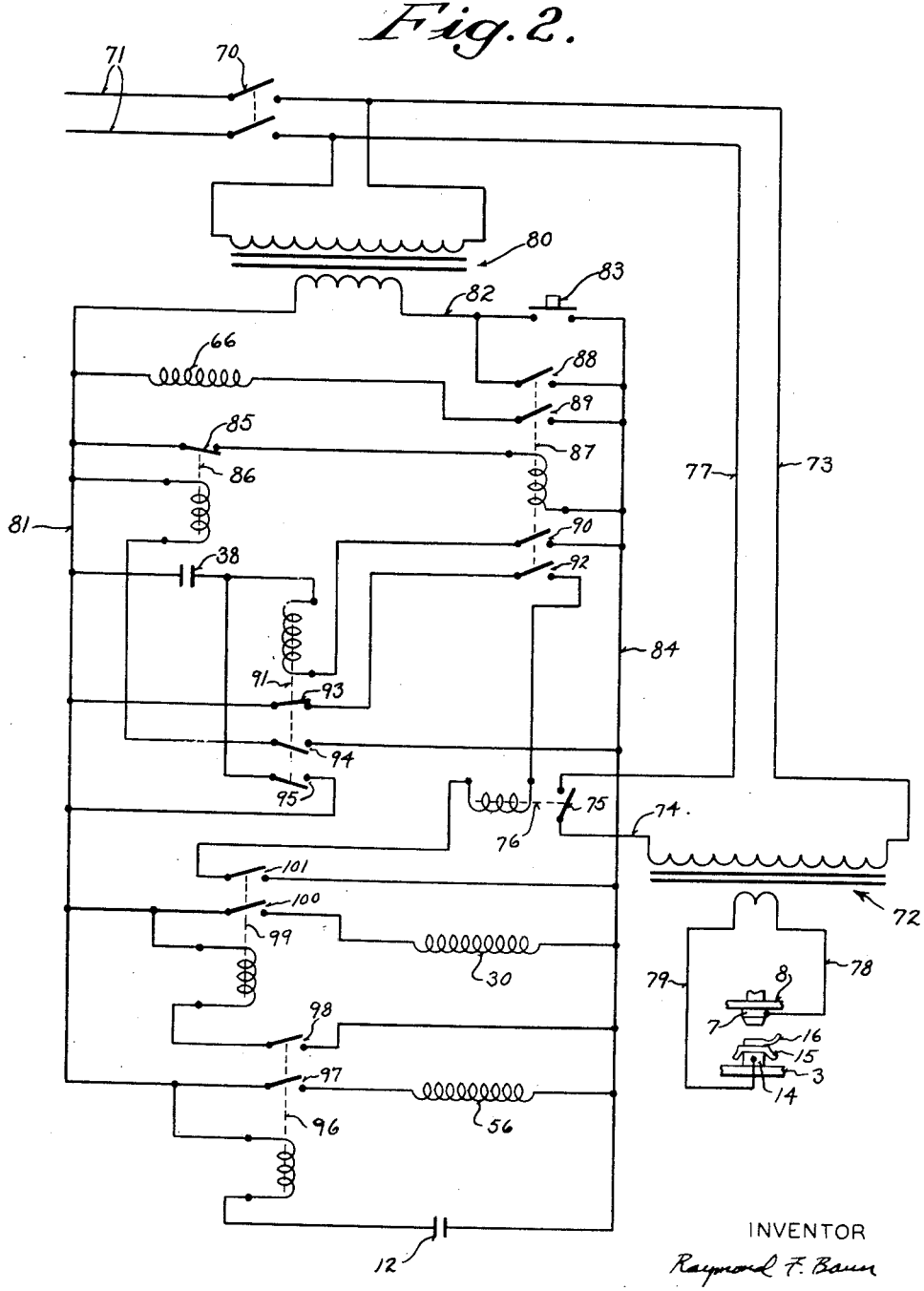

March 5, 1957  R. F. BAUN  2,784,298
APPARATUS FOR THE TERMINATION OF A HEAT APPLYING INTERVAL
Filed March 22, 1954  3 Sheets-Sheet 1

Fig. 1.

INVENTOR
Raymond F. Baun
BY
Arthur H. Seidel
ATTORNEYS

United States Patent Office 2,784,298
Patented Mar. 5, 1957

2,784,298

APPARATUS FOR THE TERMINATION OF A HEAT APPLYING INTERVAL

Raymond F. Baun, Milwaukee, Wis., assignor to Allen-Bradley Company, Milwaukee, Wis., a corporation of Wisconsin Application March 22, 1954, Serial No. 417,710

18 Claims. (Cl. 219—89)

This invention relates to heat applying apparatus and it more specifically resides in an apparatus for governing the time interval during which heating of a work piece occurs, the apparatus including means for resiliently urging a member in a working direction against the work piece and applying pressure through the member to the work piece whereby the member will be displaced in the working direction upon the occurrence of a requisite softening of the work piece material, means operated in response to such displacement for terminating the heating of the work piece, and including means for hindering displacement of the work piece material to an undesirable extent by the member engaging the same to thereby provide a heating apparatus with a heating interval terminated upon the occurrence of a desired softened condition of the work piece material without damaging penetration of the work piece.

In forming and fabricating work pieces through the application of heat it is often desired to apply heat until either a desired fusion or softening of the work piece occurs, and then to terminate the application of the heat. A particular instance is the welding of one piece to another, wherein it is essential to cause a softening, or in some instances a fusion, of the pieces at their juncture. Having attained the desired softened condition, it may then be desirable to immediately terminate the heating interval before an excessive flow of the softened material occurs.

Electrical resistance welding is illustrative of an instance wherein it is desirable to so terminate heating. In such an application a pair of work pieces to be joined are placed against one another and disposed between a pair of electrodes that are brought up tightly against the work pieces to apply substantial pressure. An electrical source is connected to the electrodes and heavy currents are passed through the electrodes and the work pieces. The resistance to current flow through the electrodes and work pieces causes a heating sufficient to raise work piece temperatures to a state of marked softening, or fusion, whereby the pieces will become united upon cooling and hardening. In the process substantial pressure is usually applied to the work pieces through the electrodes to insure the weld.

For a successful weld the heating current must raise work piece temperatures to cause requisite softening or fusion at the area of juncture between the pieces, and if an insufficient heating interval be employed in which temperatures are not raised sufficiently, then the weld will not be acceptable, or the operation may be completely abortive. On the other hand an over extended heating interval may cause such amounts of material to reach a state of fusion or softening that an excessive displacement of the work material in response to the applied electrode pressure may take place to produce thin spots or otherwise uneven surface characteristics in the material.

Since resistance welding is characterized by a softening or fusion accompanied by an application of pressure, one of the electrodes will be propelled inwardly against the work piece with a perceptible displacement upon occurrence of the softening of the material. It is unlikely that a satisfactory weld will be had unless a perceptible electrode displacement takes place. The electrode displacement is, then, not only indicative of a softening, but is a measure of the degree of softening attained. Consequently, an observation of the displacement will indicate conditions at the area of juncture between the work pieces. By controlling the interval of heating current flow in response to electrode displacement and then checking it, it is possible to govern the welding process to apply the necessary heat for a satisfactory weld and to cut off the heating current upon the detection of desired conditions at the point of juncture, as indicated by the accompanying electrode displacement.

Accordingly, in one form of the present invention means are provided to detect the movement of an electrode of an electrical resistance welder after it has been brought to bear upon a work piece and the application of heating current has been initiated. Upon the occurrence of a predetermined electrode movement that displaces softened work material the flow of heating current is terminated. Thus, the interval of heating current flow is not preset for a definite time interval only, but rather is dependent upon the state of the material heated. Variations in the composition of the work material, or the intervention of foreign matter, and the like, which require a change in the heating interval are automatically compensated.

It is an object of this invention to provide an apparatus for the heating of a work piece that terminates the application of heat to the work piece upon the occurrence of a requisite softening of the piece.

It is another object of this invention to provide an apparatus for the heating of a work piece that detects a flow of softened work piece material subjected to pressure and which responds to such detection of softening by terminating the application of heat to the piece.

It is another object of this invention to provide an apparatus for welding that will produce uniform welds upon a plurality of like work pieces.

It is another object of this invention to provide an electrical resistance heating apparatus that applies heating current to a work piece for a time interval that is terminated upon occurrence of a displacement of a heating electrode bearing against the work piece.

It is another object of this invention to provide an electrical resistance heating apparatus that employs resilient reaction means to sustain the working force of a heating electrode directed against a work piece upon the occurrence of a softening of the workpiece material, to thereby minimize the depression that will occur in the work piece by reason of the application of both temperature and pressure through the medium of the electrode.

These and other objects and advantages of this invention will appear in the description to follow. In the description reference is made to the accompanying drawings in which there is shown, by way of illustration and not of limitation, a specific form in which this invention may be embodied.

Figure 3:
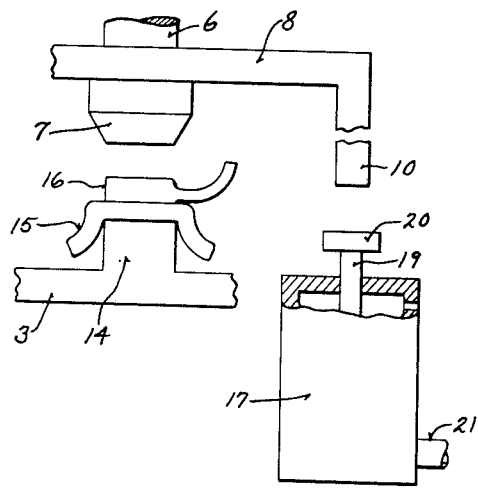
Figure 4:
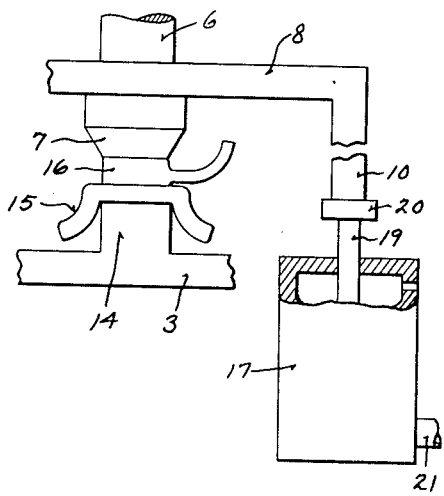

Fig. 1 is a schematic representation of an electrical resistance heating apparatus in the form of a welder that embodies the invention, and includes both hydraulic and pneumatic controls for the operation thereof, Fig. 2 is a schematic wiring diagram of a control circuit for the welder shown in Fig. 1, Fig. 3 is a schematic representation of portions of the welder showing a movable welding electrode raised above a pair of work pieces to be bonded together at the commencement of a welding cycle, Fig. 4 is a schematic representation of the portions of the welder shown in Fig. 3 with the movable welding electrode brought down upon the upper work piece.

Figure 5:
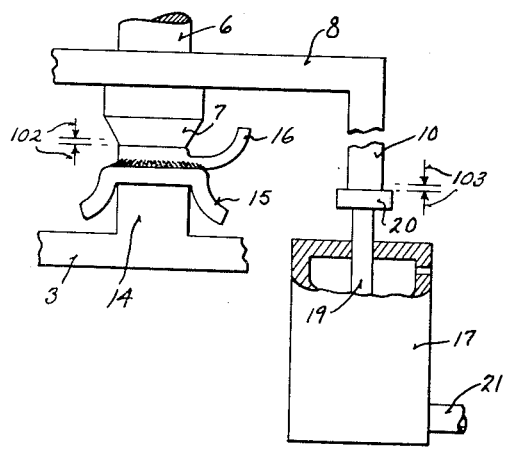
Figure 6:
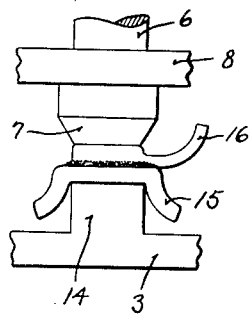
Figure 7:
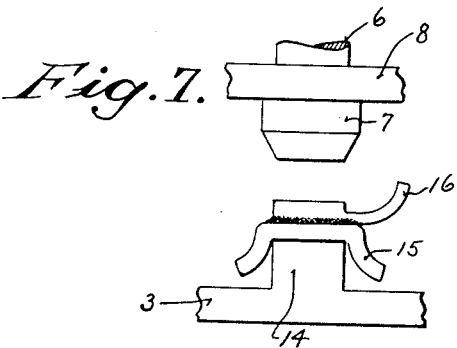

Fig. 5 is a schematic representation of the portions of the welder shown in Fig. 3 with the movable electrode bearing against the upper work piece and displaced downwardly from the position in Fig. 4, the displacement having occurred as a response to a softening of the work, Fig. 6 is a schematic representation of portions of the welder with the movable electrode bearing upon the upper work piece during a holding period in the welding cycle, and Fig. 7 is a schematic representation of portions of the welder with the movable electrode raised above the work upon the completion of the welding cycle.

The welding apparatus shown in Fig. 1 is provided with a support 1 to which is affixed a cylinder head 2 and a table 3. A piston 4 in the cylinder head 2 is biased in the upwardly direction by a spring 5 to normally assume a raised position, and extending downwardly from the piston 4 is a piston ram 6 that terminates in a vertically movable welding electrode 7. Attached to the piston ram 6 at a point directly above the welding electrode 7 is an upper platen 8 that moves vertically with the electrode 7 in response to movement of the piston 4. A pair of pressure transmitting legs 9 extend downwardly from the ends of the platen 8 and mounted horizontally between the lower ends of the legs 9 is a lower platen 10 that also moves vertically in response to movements of the piston 4. Extending from the right side of the lower platen 10 is a switch actuating tongue 11 and mounted on the base of the support 1 is a control switch 12 having a rocker arm 13 disposed to be operated by the vertical movements of the tongue 11.

Extending upwardly from the table 3 and in vertical alignment with the welding electrode 7 is a stationary welding electrode 14 upon which is seated two pieces of work comprising a lower piece 15 and an upper piece 16. The work pieces 15, 16 are to be united through the application of heating current and pressure delivered through the electrodes 7, 14.

Positioned beneath the lower platen 10 is a hydraulic cylinder 17 with a piston 18 having an upwardly extending piston shaft 19. The shaft 19 mounts a head 20 at its upper end which may be raised upwardly to seat against the platen 10. A hydraulic duct 21 opens at one end upon the cylinder 17 and terminates at its opposite end in an upper chamber 22 of an electro-magnetically operated confining valve 23. Within the valve 23 there is a seat 24 dividing the upper chamber 22 from a lower plunger chamber 25 housing a vertically movable plunger 26. The plunger 26 is biased downwardly by a spring 27 to open the seat 24, and a stem 28 extends upwardly from the plunger 26 through the opening of the seat 24 and the upper chamber 22 to mount an armature 29 associated with a magnet coil 30 and a magnet frame 31. Upon energization of the coil 30 the armature 29 is raised against the bias spring 27 to move the plunger 26 against the seat 24 and thereby close the confining valve 23.

A pressure switch 32 has a bellows 33 connected to the hydraulic duct 21 to be responsive to the pressures within the duct 21 and the cylinder 17. A cap 34 fits over the bellows 33 and is biased downwardly by a spring 35 to collapse the bellows 33. A switch actuating stem 36 extends upwardly from the top of the cap 34 to bear against the actuating arm 37 of a snap action precision switch 38 having a set of contacts 39 that assume an open position when the pressure within the bellows 33 is in a lower range of values. The contacts 39 are moved to closed position upon an upward movement of the stem 36, and through adjushtment means not shown the actuation of the contacts 39 may be set to occur at predetermined pressures within the bellows 33.

A second hydraulic duct 40 connects at one end with the plunger chamber 25 of the confining valve 23 and extends to the bottom of an accumulator vessel 41. The vessel 41 carries a supply of hydraulic fluid that extends through the duct 40 to fill the valve 23, the cylinder 17, the duct 21 and the pressure switch bellows 33.

A pneumatic pressure system is provided for the welder which includes a pressure regulator 42 connected at one side to a duct 43 leading to a source of pressure and which has an outlet connected to a supply line 44 through which is supplied a regulated pressure. Branching from the line 44 is a pressure line 45 leading to the input of a second pressure regulator 46. The pressure regulator 46 reduces the input pressure to provide a source of regulated pressure at a value substantially less than the pressure in the supply line 444. The reduced pressure is fed through a line 47 to the inlet port 48 of a feeder valve 49. A plunger 50 in the feeder valve 49 is biased by a spring 51 to normally close the inlet port 48. In this position an exhaust port 52 enters upon the interior of the valve 49 and an outlet port 53 that also enters upon the valve interior is vented to the atmosphere. Movement of the plunger 50 from the normal inlet port closing position to an exhaust port closing position opens the inlet port 48 to connect the outlet port 53 with the reduced pressure line 47. A stem 54 extends from the plunger 50 and terminates in an armature 55 associated with a magnet coil 56 and magnet frame 57. Energization of the coil 56 causes the armature 55 to move against the bias spring 51 to shift the plunger 50 to open the inlet port 48. The valve outlet port 53 forms one end of a line 58 that opens upon the interior of the accumulator vessel 41, to thereby feed pressure to the surface of the hydraulic fluid.

The pressure supply line 44 terminates at the inlet port 59 of an electrode control valve 60 that is similar to the valve 49. Valve 60 is provided with a plunger 61 biased by a spring 62 to a normal position closing the inlet port 59 and opening an exhaust port 63. A stem 64 extends from the plunger 61 and terminates in an armature 65 that may be actuated upon energization of a magnet coil 66 associated with a magnet frame 67. An outlet port 68 for the electrode control valve 60 leads into a pressure line 69 that enters, at its opposite end, into the cylinder head 2.

Referring now to Fig. 2, the circuit network shown for controlling the operation of the welding apparatus is connected through a line switch 70 to a pair of power lines 71. One side of the primary of a welding transformer 72 is connected through a lead 73 to one of the output terminals of the line switch 70 and the other side is connected through a lead 74, the normally open contacts 75 of a welding control relay 76 and a lead 77 to the other output terminal of the line switch 70. A one turn secondary winding for the welding transformer 72 has one side connected through a heavy bus lead 78, of large cross section adequate to carry welding current, to the vertically movable welding electrode 7 and the other side is connected through a similar heavy bus lead 79 to the stationary electrode 14.

The primary of a control transformer 80 is connected across the leads 73 and 77. One side of a secondary for the transformer 80 is connected to an output lead 81 and the opposite side of the secondary is connected through a lead 82 to one side of a normally open start push button 83. The opposite side of the push button 83 is attached to a second output lead 84. Connected through the normally closed contacts 85 of a release control relay 86 to the output leads 81 and 84 is the coil of a start control relay 87. The start control relay 87 has a first set of normally open contacts 88 joined between the lead 82 and the output lead 84 to shunt the start push button 83, a second set of normally open contacts 89 connect the magnet coil 66 of the electrode control valve 60 between the output leads 81 and 84 when closed, a third set of normally open contacts 90 forming a part of the relay 87 join one side of the coil of a hold control relay 91 to the output lead 84 when closed, and a fourth set of normally open contacts 92 when closed join one side of the winding of the welding control relay 76 to one side of a set of normally closed contacts 93 of the hold control relay 91. The normally closed contacts 93 are joined at their opposite side to the output lead 81. A first set of normally open contacts 94 of the hold control relay 91, that operate to closed position with a time delay, connect the coil of the release control relay 86 between the output leads 81 and 84 when closed. A second set of normally open contacts 95 of the hold control relay 91 join a side of the coil of the relay 91 that is connected to one side of the precision switch 38 to the output lead 81 when closed. The side of the precision switch 38 opposite that connected to the coil of the relay 91 is also joined to the output lead 81, thus the normally open contacts 95 are disposed in shunting relation to the contacts of the precision switch 38.

One side of the contacts of the control switch 12 is connected to one end of the output lead 84 and the opposite side of the contacts of the control switch 12 is connected to one side of the coil of a pressure control relay 96. The opposite side of the coil of the pressure control relay 96 is connected to the output lead 81. A first set of normally open contacts 97 that form a part of the pressure control relay 96 are in circuit with the magnet coil 56 of the feeder valve 49 to connect the coil 56 between the output leads 81 and 84 when closed. A set of time delay normally open contacts 98 which are moved to closed position at a substantial time interval after the closure of the contacts 97 also form a part of the relay 96 and are disposed to connect the coil of a pressure locking control relay 99 between the output leads 81 and 84 when closed. The pressure locking control relay 99 has two sets of normally open contacts. The first set 100 will close upon energization of the associated relay coil to connect the magnet coil 30 of the confining valve 23 across the output leads 81 and 84. The second set of normally open contacts 101 act with a delayed closure to join the side of the coil of the welding control relay 76 opposite that side joined to the contacts 92 of the start control relay 87 with the output lead 84.

The normal position before the start of a welding cycle for the electrode 7 is the raised position, as shown in Figs. 1 and 3, and when in this position, the plunger 61 of the electrode control valve 60 will be under the influence of the bias spring 62 to close the inlet port 59 and open the exhaust port 63. The cylinder head 2 is therefore vented through the supply duct 69, the outlet port 68, the chamber of the electrode control valve 60 and the exhaust port 63 to the atmosphere, whereby the spring 5 within the cylinder head 2 is able to raise the piston 4 and electrode 7. At the commencement of the welding cycle the plunger 50 of the valve 49 closes the inlet port 48 and vents the accumulator vessel 41 through the line 58, the outlet port 53 and the exhaust port 52. The confining valve 23 has its plunger 26 disposed in the downward position to open the seat 24, and consequently atmospheric pressure will prevail within the cylinder 17 and the bellows 33. The precision switch contacts 39 will be in a corresponding open position.

With the electrode 7 raised the work pieces 15 and 16, which are to be welded one to the other, are placed one above the other upon the stationary electrode 14 in a position such that the electrode 7 may be brought downwardly upon the upper work piece 16 to apply pressure and conduct current through the pieces 15 and 16 upon closing the primary circuit of the welding transformer 72. This position of the work pieces 15 and 16, with respect to the electrodes 7, 14 is clearly shown in the fragmentary view of Fig. 3. Figs. 3 through 7 show the relative positions of the electrodes 7, 14, the work pieces 15, 16 and the platen 10 and piston shaft head 20 during the respective steps in the welding cycle that are now to be described, and in Figs. 3, 4 and 5 the cylinder 17 and a portion of the platen 10 that engages the piston shaft head 20 are shown to the right of the electrodes 7, 14.

To initiate the welding cycle the normally open push button 83 is depressed. Closure of the push button 83 completes an energizing circuit for the coil of the start control relay 87 including the output lead 81 connected to one side of the secondary of transformer 80, the normally closed contacts 85, lead 84, push button 83 and the lead 82 connected to the transformer secondary. The contacts 88 of the relay 87 will now close to shunt the push button 83, which may now be released to normal open position without causing a deenergization of the coil of the relay 87. The output lead 84 will then be connected through the contacts 88 and lead 82 to supply voltage to the remaining electro-magnetic circuit elements along with the output lead 81. The contacts 90 close to prepare an energizing circuit for the coil of the hold control relay 91, which circuit will be completed upon a subsequent closure of the pressure switch 38. The contacts 92 close as a preliminary step in readying an energizing circuit for the coil of the welding control relay 76. The remaining set of contacts 89, of the start control relay 87, close to place the magnetic coil 66 of the electrode control valve 60 across the output leads 81 and 84 to energize the same.

Energization of the coil 66 moves the armature 65 and the plunger 61 of the electrode control valve 60 against the bias of the spring 62 to close the exhaust port 63 and open the inlet port 59. Pressure is then applied through the outlet port 68 and supply line 69 to the cylinder head 2. The application of pressure within the cylinder head 2 moves the piston 4 in a downward stroke against the spring 5. The downward stroke of the piston 4 lowers the ram 6 and the welding electrode 7 to bring the electrode 7 into bearing engagement with the upper work piece 16. This position of the electrode 7 is shown in Fig. 4, and since the start control relay 87 will remain energized until the end of the welding cycle the coil 66 of the electrode control valve 60 will also remain energized to apply pneumatic pressure to the piston 4 and thereby exert a continued working force upon the pieces 15 and 16.

As the piston ram 6 moves downwardly the tongue 11 on the lower platen 10 will depress the rocker arm 13 to cause closure of the control switch 12. Closure of the control switch 12 indicates to the circuit network that the welding electrode 7 has been lowered beneath its normal raised position, and the oil pressure control relay 96 will be energized. The immediate closure of the normally open contacts 97 of the relay 96 connects the magnetic coil 56 of the feeder valve 49 across the output leads 81, 84. The valve plunger 50 is thereby moved to the right, as viewed in Fig. 1, and pressure from the regulator 46 is conducted through the valve 49 to the line 58 and hence to the surface of the hydraulic fluid within the accumulator vessel 41. Since the confining valve 23 is open, pressure within the cylinder 17 increases to raise the piston 18 and the head 20 toward the lower platen 10. The head 20 will engage the underside of the platen 10 and the upward travel will be arrested, the parts assuming the position of Fig. 4. The downwardly directed working force acting upon the piston 4 is substantially greater than the upwardly directed force acting through the piston 18 and the piston shaft head 20. Thus, the net force exerted upon the work pieces 15 and 16 will be sufficient to apply requisite pressure for producing a satisfactory weld.

The time delay contacts 98 of the oil pressure control relay 96 are set to close after a time interval within which the output pressure of the regulator 46 has become established within the cylinder 17 and bellows 33 of the pressure switch 32. Upon closure, the contacts 98 connect the coil of the pressure locking control relay 99 between the output leads 81 and 84, thereby causing an immediate closure of the contacts 100. The contacts 100 complete an energizing circuit for the magnet coil 30 of the confining valve 23, and energization of the coil 30 causes movement of the plunger 26 against the bias of the spring 27 to valve closing position. The hydraulic fluid within the cylinder 17, duct 21 and pressure switch bellows 33 is then confined and may not retreat to the accumulator vessel 41. The pressure of the fluid will be retained, with an accompanying upward thrust of the piston 18 to retain the head 20 against the underside of the platen 10. The apparatus of the invention is now readied for the application of welding current, Fig. 4 still depicting the relative positions of the elements shown therein.

Closure of the time delay contacts 101 will now follow to complete the energizing circuit for the coil of the welding control relay 76 that comprises the contacts 101, joined at one side through a lead to the output lead 84, the coil of the relay 76, the closed contacts 92 of the start control relay 87, and the normally closed contacts 93 of the hold control relay 91 which are connected to the output lead 81. Excitation of the welding control relay 76 closes its contacts 75 to join the primary of the welding transformer 72 to the power source. Welding current will flow from the secondary of the transformer 72 through the leads 78 and 79, the electrodes 7 and 14, and the work pieces 15 and 16. Heating due to resistance to current flow will occur in the electrodes 7, 14 and the pieces 15, 16 thereby causing a rapid rise in the temperature of the pieces 15 and 16 to produce requisite softening or fusion at the junction surfaces. The application of the working pressure through the electrode 7 will cause a partial displacement of the softened or molten material that will be evidenced by a perceptible downward movement of the electrode 7. Such a downward movement of the electrode 7 is represented in Fig. 5 by the interval between the arrows 102, and the complementary downward travel of the lower platen 10 is represented by the interval between the arrows 103. This movement of the platen 10 causes a like downward travel of the piston shaft head 20, to deliver a compressive force through the piston 18 to the fluid within the cylinder 17. The fluid is displaced into the pressure switch bellows 33 which expand in response to the increasing pressure of the fluid. The cap 34 and stem 36 are moved upwardly and the precision switch 38 will be operated to contact closed position.

Closure of the precision switch 38 energizes the winding of the hold control relay 91 through a circuit that had been readied by previous closure of the contacts 90 of the start control relay 87. The normally closed contacts 93 are then opened to interrupt the energizing circuit of the coil of the welding control relay 76 and restore the contacts 75 to their normally open position to terminate the flow of welding current from the welding transformer 72. Further fusion, or softening, of the work piece material will likewise be terminated.

For producing a satisfactory weld it is desirable to clampingly engage the work pieces 15, 16 between the electrodes 7, 14 for an interval after the termination of welding current in which the molten, or softened work material may resolidify. It is the purpose of the hold control relay 91 to provide this time interval, the duration of which interval is determined by the time lapse between the opening of the normally closed contacts 93 and the closure of the normally open time delay contacts 94.

As has been noted, the downward travel of the welding electrode 7 and platen 10, that is permitted by a softening of the work material, depresses the piston 18 to displace the fluid from within the cylinder 17 to within the bellows 33 and to cause a rise of pressure within the cylinder 17. The downwardly directed working force of the piston 4 will now be sustained to a greater degree by the head 20 and piston 18. The electrode pressure upon the work pieces 15, 16 is then decreased to eliminate excessive displacement of the softened work material that would occur during the hold period if continued maximum working force were applied to the work material. The compression of the hydraulic fluid may be caused to increase fluid pressure whereby the working force of the piston 4 may be substantially entirely sustained by the piston 18 and head 20, to hinder any further displacement of the electrode 7 while continuing the desired hold period after the termination of welding current flow. Fig. 6 represents the electrodes 7, 14 and work pieces 15, 16 during the hold period, in which the relative positions are like that of Fig. 5 and the softened material has solidified into a finished weld.

The relay contacts 95, which will close instantly upon energization of the hold control relay 91, provide a self-holding circuit for the relay 91 shunting the pressure switch 38. The relay 91 will then be retained in a state of energization in the event that the precision switch 38 might move to open position.

The closure of the time delay contacts 94 of the hold control relay 91, to terminate the hold period, connects the coil of the release control relay 86 between the output leads 81, 84. The coil of the relay 86 is then excited to open the normally closed contacts 85 in the energizing circuit of the coil of the start control relay 87. The resulting deenergization of the start control relay 87 opens the self-holding contacts 88, and also the contacts 89, 90, and 92. The coil of the start control relay 87 is then disconnected from the transformer 80 until a subsequent closure of the start button 83 to start another welding cycle. The opening of the contacts 88 also disconnects the output lead 84 from the transformer 80 to cause deenergization of the several electro-magnetic control devices not otherwise deenergized by the opening of the contacts of the relay 87. The deenergization of the coil 66 of the electrode control valve 60 causes the plunger 61 to move in response to the bias spring 62 to close the inlet port 59 of the valve 60 and vent the cylinder head 2. The piston 4 will now move upwardly in response to the spring 5 to retract the welding electrode 7 to the position shown in Fig. 7.

The platen 10 also moves upwardly and the tongue 11 will retreat from the rocker arm 13 to return the control switch 12 to the normally open position. Upon the piston 4 returning to its uppermost position the welding cycle will have been completed and the work pieces 15 and 16 may be removed from the electrode 14 as a single unitary object. The plungers of the feeder valve 49 and confining valve 23 will have been returned to normal position to reduce the pressure in the hydraulic system and the precision switch 38, that forms a part of the pressure switch 32, will be returned to open position. The apparatus of the invention is then reset in the initial position described for commencement of a subsequent welding operation.

The duration of heat application to the work pieces is determined by the condition of the work material. After occurrence of a requisite softening, which term is used herein to include a state of fusion, an electrode displacement occurs. The displacement signifies that the work piece material has satisfactorily softened for a proper weld, and upon detection of this significant electrode displacement the application of heat is terminated. The invention thus insures that excessive heating and softening will not occur. Further, the invention provides a novel increase in resistance to the working force, after the requisite softening, to prohibit detrimental excessive displacement of the softened work material.

I claim:

1. In a heating apparatus for raising the temperature of a work piece to cause softening of the work piece material the combination comprising means for supporting the work piece including a member to be brought into engagement with the work piece and to bear against the same; propelling means for moving said member into engagement with the work piece and to urge the member against the work piece for a further movement upon a softening of the work piece; means for applying heat to the work piece to cause a softening thereof; means responsive to a movement of said member occurring upon a softening of the work piece for terminating the application of heat to the work piece upon a softening thereof; hindering means other than said work piece engageable by said work piece engaging member to be moved thereby when said softening is initiated; and means rendering said hindering means resistant to motion of said work piece engaging member after said softening has occurred.

2. In a heating apparatus for raising the temperature of a work piece to cause softening of the work piece material the combination comprising a pair of members relatively movable toward one another to engage and position a work piece; propelling means for moving one of said members toward the work piece to urge the member against the work piece after engagement therewith whereby a further movement of the member will occur upon a softening of the work piece; heating means for heating said work piece to softening temperatures including means for initiating a heating interval; means responsive to a movement of the member urged by said propelling means against the work piece in response to a softening of the work piece to terminate the heating interval; and means other than said heat terminating means adapted to limit the movement occurring upon softening of the work piece otherwise than by resolidification of the work piece, said means movable with the member moved by said propelling means to move therewith when softening is initiated and to increase opposition to further movement as movement takes place.

3. In a heating apparatus for raising the temperature of a work piece to cause a softening of the work piece material the combination comprising a rest upon which the work piece may be disposed; a member movable toward and away from the work piece disposed upon the rest; a fluid chamber having a piston joined to said member adapted to displace said member upon admission of fluid under pressure to within the chamber to move said member against the work piece and exert pressure thereon; heating means for heating said work piece to softening temperatures whereby said member will be moved against said work piece upon a softening thereof to cause a displacement of the softened work material in response to fluid pressure within said chamber; means responsive to the movement of the member that causes displacement of the work material to terminate heating of the work piece; and hindering means positioned to oppose motion of said piston after limited displacement of said member by said piston in response to softening of the work material.

4. In a heating apparatus for raising the temperature of a work piece to cause softening of the work piece material the combination comprising means for supporting the work piece including a member movable toward and away from the work piece adapted to be brought into engagement with the work piece and to bear against the same; propelling means for moving said member into engagement with the work piece and to urge the member against the work piece for a further movement upon a softening of the work piece; means for applying heat to the work piece to cause a softening thereof; means responsive to a movement of said member occurring upon a softening of the work piece for terminating the application of heat to the work piece upon a softening thereof; hindering means operative to limit movement of said member after softening of said work piece; and operating means for said propelling means to initiate retraction of said member from the work piece after a time interval following the termination of the application of heat to the work piece.

5. In a heating apparatus for raising the temperature of a work piece to cause softening of the work piece material the combination comprising means for supporting the work piece including a member to be brought into engagement with the work piece and to bear against the same; propelling means for moving said member into engagement with the work piece and to urge the member against the work piece for a further movement upon a softening of the work piece; releasable hindering means interposed in the path of travel of said member including means urging the same toward the member with a force substantially less than that of said propelling means for released retreat with said member when said member is moved against the work piece; means for applying heat to the work piece to cause a softening thereof; locking means rendered operative to resist retreating movement of said hindering means substantially coincident with application of heat to said work piece to entirely prohibit retreat of the same after a determined interval whereby the force exerted by said propelling means is substantially entirely sustained by said hindering means upon softening of said work piece under increased temperature; and reaction means responsive to the reactive force of said hindering means in response to the working force imposed thereon by said propelling means when said work piece has softened for terminating the application of heat to the work piece.

6. In an electrical resistance heating apparatus having electrodes relatively movable toward one another to engage a work piece and an electrical supply circuit connected to said electrodes to cause heating current to flow through the electrodes and heat the work piece; the combination of propelling means for moving one of said electrodes toward the work piece to engage the work piece between the electrodes and to urge said electrode against the work piece for a further movement upon a softening of the work piece due to a flow of heating current; and means that is engaged by and moved with the electrode moved by said propelling means that is thereby responsive to a softening and flow of work piece material caused by heating current and pressure of said electrode for terminating the current and interposing resistance to further movement of said movable electrode upon occurrence of softening and flow of work piece material.

7. In an electrical resistance heating apparatus having electrodes relatively movable toward and away from one another to engage a work piece therebetween and an electrical supply circuit connected to said electrodes to cause heating current to flow through the electrodes; the combination of pressure exerting propelling means for moving one of said electrodes in a working direction toward the work piece to engage the work piece between the electrodes, which propelling means urges said electrode against the work piece for a further movement in the working direction upon a softening of the work piece due to a flow of heating current; current initiating means including a trip switch closed by approach of said movable electrode to working position and time delay means in circuit therewith operative to activate the heating current supply circuit after arrival of said movable electrode in working position and the establishment of working pressure for causing heating current to flow upon engagement of the work piece by the electrodes; and means responsive to a displacement in the working direction of the electrode movable by said propelling means that occurs upon a softening of the work piece including current terminating means for terminating the flow of heating current from the supply circuit upon a displacement of the electrode occasioned by a softening of the work piece and including hindering means for opposing continued movement of said electrode upon a softening of said work piece.

8. In an electrical resistance heating apparatus having electrodes relatively movable toward and away from one another to engage an electrically conductive work piece therebetween and an electrical supply circuit connected to said electrodes to cause electric current to flow through and heat the work piece; the combination of pressure exerting propelling means for moving one of said electrodes in a working direction toward the work piece to engage the work piece between the electrodes and for retracting the electrode away from the work piece, which propelling means is adapted to urge said electrode against the work piece for a further movement in the working direction upon a softening of the work piece due to a flow of electric current passing therethrough; current initiating means including trip switch means closed by approach of said propelling means toward said work piece for causing heating current to flow through the electrodes and work piece upon engagement of the work piece by the electrodes; means responsive to a displacement in the working direction of the electrode movable by said propelling means that occurs upon a softening of the work piece including means rendered active by said trip switch, movable toward said propelling means to contact the same and including current terminating means for terminating the flow of current through the electrodes and work piece from the supply circuit upon a displacement of the electrode occasioned by a softening of the work piece; and operating means for said propelling means to initiate retraction of the electrode operable by the propelling means after a time interval following the termination of heating current flow in which the work piece has hardened.

9. In an electrical resistance heating apparatus having electrodes relatively movable toward one another to apply pressure to an electrically conductive work piece therebetween and an electrical supply circuit connected to said electrodes to cause electric current to flow through and heat the work piece material under pressure therebetween to a working temperature; the improvement in means for controlling the duration of heating current and the linear extent of electrode motion which comprises propelling means for moving one of said electrodes in a working direction toward the work piece including means for resiliently urging said electrode in the working direction with a determined working force when arrested, said propelling means including an arresting abutment movable therewith; releasable hindering means interposed in the path of travel of said arresting abutment including means urging the same toward said abutment with a force substantially less than the working force of said propelling means for released retreat with said abutment when said propelling means is active in moving in the working direction; heating current initiating means rendered active to cause said current supply circuit to deliver current to said electrodes after contact of the same with the work piece; locking means rendered operative to resist retreating movement of said hindering means substantially coincident with initiation of said heating current and to entirely prohibit retreat of the same after a determined interval whereby the force exerted by said propelling means is substantially entirely sustained by said hindering means upon softening of said work piece under increased temperature; and current terminating reaction means responsive to the reactive force exerted by said hindering means in response to the working force imposed thereon by said propelling means when said work piece has softened and deformed a predetermined amount for terminating the supply of current delivered by said electrical supply circuit.

10. In an electrical resistance heating apparatus having electrodes relatively movable toward one another to apply pressure to an electrically conductive work piece therebetween and an electrical supply circuit connected to said electrodes to cause electric current to flow through and heat the work piece material under pressure therebetween to a working temperature; the improvement in means for controlling the duration of heating current which comprises propelling means for moving one of said electrodes in a working direction toward the work piece including means for resiliently urging said electrode in the working direction with a determined working force when arrested, said propelling means including an arresting abutment movable therewith; releasable hindering means interposed in the path of travel of said arresting abutment including means urging the same toward said abutment with a force substantially less than the working force of said propelling means for released retreat with said abutment when said propelling means is active in moving in the working direction; heating current initiating means rendered active to cause said current supply circuit to deliver current to said electrodes after contact of the same with the work piece; locking means rendered operative to resist retreating movement of said hindering means substantially coincident with initiation of said heating current; and current terminating reaction means responsive to the reactive force exerted by said hindering means in responsive to the working force imposed thereon by said propelling means when said work piece has softened and deformed a predetermined amount for terminating the supply of current delivered by said electrical supply circuit.

11. In an electrical resistance heating apparatus having electrodes relatively movable toward one another to apply pressure to an electrically conductive work piece therebetween and an electrical supply circuit connected to said electrodes to cause electric current to flow through and heat the work piece material under pressure therebetween to a working temperature; the improvement in means for controlling the duration of heating current and the linear extent of electrode motion which comprises propelling means for moving one of said electrodes in a working direction toward the work piece and for retracting the electrode away from the work piece including means for resiliently urging said electrode in the working direction with a determined working force when arrested against the work piece, said propelling means including an arresting abutment movable therewith; releasable hindering means interposed in the path of travel of said arresting abutment including means urging the same toward said abutment with a force substantially less than the working force of said propelling means for released retreat with said abutment when said propelling means is active in moving in the working direction; heating current initiating means rendered active to cause said current supply circuit to deliver current to said electrodes after contact of the same with the work piece; locking means rendered operative to resist retreating movement of said hindering means substantially coincident with initiation of said heating current and to entirely prohibit retreat of the same after a determined interval whereby the force exerted by said propelling means is substantially entirely sustained by said hindering means upon softening of said work piece under increased temperature; current terminating reaction means responsive to the reactive force exerted by said hindering means in response to the working force imposed thereon by said propelling means when said work piece has softened and deformed a predetermined amount for terminating the supply of current delivered by said electrical supply circuit; and operating means for said propelling means to initiate retraction of the electrode movable thereby away from the work piece after a time interval following the termination of current flow from the electrical supply circuit in which the work piece has hardened.

12. In an electrical resistance heating apparatus having electrodes relatively movable toward one another to apply pressure to an electrically conductive work piece therebetween and an electrical supply circuit connected to said electrodes to cause electric current to flow through and heat the work piece material under pressure therebetween to a working temperature; the improvement in means for controlling the duration of heating current and the linear extent of electrode motion which comprises propelling means for moving one of said electrodes in a working direction toward the work piece including means for resiliently urging said electrode in the working direction with a determined working force when arrested, said propelling means including an arresting abutment movable therewith; heating current initiating means rendered active to cause said current supply circuit to deliver current to said electrodes during a contact of the same with the work piece; a hindering member interposed in the path of travel of said arresting abutment; pressure exerting means urging said hindering member toward said abutment with a force substantially less than the working force of said propelling means for retreat with said abutment when said propelling means is active in moving in the working direction into engagement with said work piece, which pressure exerting means applies increasing force to said hindering member upon a continued movement of said abutment and associated electrode in response to said propelling means occasioned by softening of said work piece due to flow of heating current to entirely prohibit retreat of the hindering member after a determined interval of travel whereby the force exerted by said propelling means is substantially entirely sustained by said hindering member; and current terminating reaction means responsive to the reactive force exerted by said pressure exerting means in response to the working force imposed thereon by said propelling means when said work piece has softened and deformed a predetermined amount for terminating the supply of current delivered by said electrical supply circuit.

13. In an electrical resistance heating apparatus having electrodes relatively movable toward one another to apply pressure to an electrically conductive work piece therebetween and an electrical supply circuit connected to said electrodes to cause electric current to flow through and heat the work piece material under pressure therebetween to a working temperature; the improvement in means for controlling the duration of heating current which comprises propelling means for moving one of said electrodes in a working direction toward the work piece including means for resiliently urging said electrode in the working direction with a determined working force when arrested, said propelling means including an arresting abutment movable therewith; heating current initiating means rendered active to cause said current supply circuit to deliver current to said electrodes during a contact of the same with the work piece; a hindering member interposed in the path of travel of said arresting abutment; pressure exerting means urging said hindering member toward said abutment with a force less than the working force of said propelling means for retreat with said abutment when said propelling means is active in moving in the working direction; which pressure exerting means applies increasing force to said hindering member upon a continued movement of said abutment and associated electrode in response to said propelling means occasioned by softening of said work piece due to flow of heating current; and current terminating reaction means responsive to the reactive force exerted by said pressure exerting means in response to the working force imposed thereon by said propelling means when said work piece has softened and deformed a predetermined amount for terminating the supply of current delivered by said electrical supply circuit.

14. In an electrical resistance heating apparatus having electrodes relatively movable toward one another to engage an electrically conductive work piece and an electrical supply circuit connected to said electrodes to cause electric current to flow through and heat the work piece the combination of pressure exerting means for moving the first of said electrodes toward and into engagement with the work piece that is also in engagement with the second of said electrodes and to exert a working force upon said work piece upon engagement with the first electrode therewith; an abutment movable with the first of said electrodes; a hydraulic cylinder having a piston movable therein from which extends a piston rod adapted to engage said abutment; a pressure switch responsive to the hydraulic pressures within said cylinder; a hydraulic inlet for said cylinder including a valve operable to confine liquid under pressure within the cylinder, pressure switch and the inlet between the cylinder and valve; means for delivering liquid under pressure through said valve into said cylinder to move said piston rod into engagement with said abutment and exert a force thereon less than that of said pressure exerting means to permit a retreat of said piston rod to within said cylinder upon a movement of said first electrode in response to the working force of said pressure exerting means; operating means to cause said valve to confine liquid as aforesaid and to initiate electric current flow for heating the work piece whereby the liquid is confined in advance of a softening of the work piece due to current flow, which softening permits said first electrode and abutment to be displaced in response to said pressure exerting means whereby said piston rod retreats within said cylinder to raise the pressure of the liquid confined by said valve to operate said pressure switch; and current terminating means operable by said switch for terminating the current flow from said electrical supply circuit.

15. An apparatus in accordance with claim 14 in which the retreat of said piston rod within said cylinder raises the pressure of the confined liquid to prohibit further retreat of the piston rod whereby the force exerted by said pressure exerting means is substantially entirely sustained by said hindering means upon a softening of the work piece.

16. In an electrical resistance heating apparatus a set of electrodes, a source of heating current connected thereto, fluid-operated work-stroke means engaging said electrodes for moving the same toward a work piece, working fluid control means for delivering and releasing a supply of fluid to said fluid-operated work-stroke means, detecting means including a liquid operated hydraulic displacement chamber containing a displacement member movable oppositely of and toward said work-stroke means to be contacted and positioned thereby when said electrodes are moved toward working position, switch means adapted to activate said heating current source after arrival of said electrodes in working position in contact with a work piece, liquid trapping means closeable after arrival of said electrodes in working position for restraining escape of liquid from said hydraulic chamber, and means responsive to alteration in pressure in said hydraulic chamber adapted to terminate activation of said heating current source when the work piece is heated by said heating current and said displacement member is moved in consequence thereof.

17. An electrical resistance heating apparatus in accordance with claim 16, wherein the means responsive to alteration in pressure in the hydraulic chamber include means cooperatively connected with said working fluid control means to cause release of said working fluid after termination of the activation of the heating current source.

18. An electrical resistance heating apparatus in accordance with claim 16 wherein said detecting means acts to interpose resistance to travel of said fluid-operated work-stroke means after closure of said liquid trapping means and an initial pressure altering movement of the electrodes induced by heating of the work piece material.

References Cited in the file of this patent

UNITED STATES PATENTS

| | | |
|---|---|---|
| 1,043,637 | Smith | Nov. 5, 1912 |
| 1,736,428 | Bryant | Nov. 19, 1929 |
| 1,847,890 | Osborne | Mar. 1, 1932 |
| 1,848,905 | Rabezzana | Mar. 8, 1932 |
| 1,967,094 | Lincoln | July 17, 1934 |
| 2,018,379 | Pfeiffer | Oct. 22, 1935 |
| 2,067,064 | Platz | Jan. 5, 1937 |
| 2,377,601 | Bayles | June 5, 1945 |